(12) United States Patent
Gaber et al.

(10) Patent No.: US 11,151,014 B2
(45) Date of Patent: Oct. 19, 2021

(54) SYSTEM OPERATIONAL ANALYTICS USING ADDITIONAL FEATURES FOR HEALTH SCORE COMPUTATION

(71) Applicant: EMC IP Holding Company LLC, Hopkinton, MA (US)

(72) Inventors: Shiri Gaber, Beer Sheva (IL); Omer Sagi, Mazkeret Batya (IL); Amihai Savir, Sansana (IL); Ohad Arnon, Beit Nir (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 25 days.

(21) Appl. No.: 16/038,370

(22) Filed: Jul. 18, 2018

(65) Prior Publication Data
US 2020/0026635 A1    Jan. 23, 2020

(51) Int. Cl.
*G06F 11/34* (2006.01)
*G06F 11/30* (2006.01)
(Continued)

(52) U.S. Cl.
CPC ...... *G06F 11/3476* (2013.01); *G06F 11/3006* (2013.01); *G06F 17/15* (2013.01); *G06N 20/00* (2019.01); *H04L 67/1002* (2013.01)

(58) Field of Classification Search
CPC ............ H04L 67/1097; H04L 67/1002; H04L 41/147; G06N 20/00; G06N 7/005;
(Continued)

(56) References Cited

U.S. PATENT DOCUMENTS 9,699,049 B2 * 7/2017 Gupta ................... H04L 41/142
10,505,818 B1 * 12/2019 Yona ....................... H04L 43/16
(Continued)

OTHER PUBLICATIONS

U.S. Appl. No. 14/980,479 entitled, "System Operational Analytics" filed Dec. 28, 2015.
(Continued)

*Primary Examiner* — Matthew M Kim
*Assistant Examiner* — Matthew N Putaraksa
(74) *Attorney, Agent, or Firm* — Ryan, Mason & Lewis, LLP

(57) ABSTRACT

Techniques are provided for system operational analytics using additional features over time-series counters for health score computation. An exemplary method comprises: obtaining log data from data sources of a monitored system; applying a counting function to the log data to obtain time-series counters for a plurality of distinct features within the log data; applying an additional function to the time-series counters for the plurality of distinct features; and processing an output of the additional function using a machine learning model to obtain a health score for the monitored system based on the output of the additional function. The additional function comprises, for example, an entropy function representing a load balancing of a plurality of devices in the monitored system; one or more clustered counts for a plurality of entities in the monitored system; a number of unique values; and/or one or more modeled operations based on correlations between a plurality of different operations in the monitored system.

20 Claims, 9 Drawing Sheets

(51) Int. Cl.
*G06F 17/15* (2006.01)
*G06N 20/00* (2019.01)
*H04L 29/08* (2006.01)

(58) Field of Classification Search
CPC ... G06N 3/02; G06F 11/3034; G06F 11/3419; G06F 11/3452; G06F 11/3476; G06F 11/3006; G06F 16/24564; G06F 21/6218; G06F 17/15
See application file for complete search history.

(56) References Cited

U.S. PATENT DOCUMENTS

| | | | | |
|---|---|---|---|---|
| 10,613,525 | B1* | 4/2020 | Kapoor | G06F 11/3476 |
| 10,762,513 | B2* | 9/2020 | Southall | G06N 5/02 |
| 10,855,701 | B2* | 12/2020 | Krishtal | H04L 63/0236 |
| 10,860,405 | B1* | 12/2020 | Zonneveld | G06F 11/0709 |
| 2008/0059474 | A1* | 3/2008 | Lim | G06F 16/93 |
| 2013/0080375 | A1* | 3/2013 | Viswanathan | G06F 11/076 706/52 |
| 2015/0227838 | A1* | 8/2015 | Wang | G06N 20/00 706/12 |
| 2017/0262818 | A1* | 9/2017 | Horrell | G06Q 10/0635 |
| 2018/0083833 | A1* | 3/2018 | Zoll | G06F 11/3452 |
| 2018/0176241 | A1* | 6/2018 | Manadhata | G06F 16/2477 |
| 2019/0020555 | A1* | 1/2019 | Tayal | H04L 67/1012 |
| 2019/0108888 | A1* | 4/2019 | Sarkar | G11C 16/349 |
| 2020/0257581 | A1* | 8/2020 | Darwin | G06F 11/3419 |

OTHER PUBLICATIONS

U.S. Appl. No. 15/282,092 entitled, "Methods and Apparatus for Multi-Site Time Series Data Analysis" filed Sep. 30, 2016.

* cited by examiner

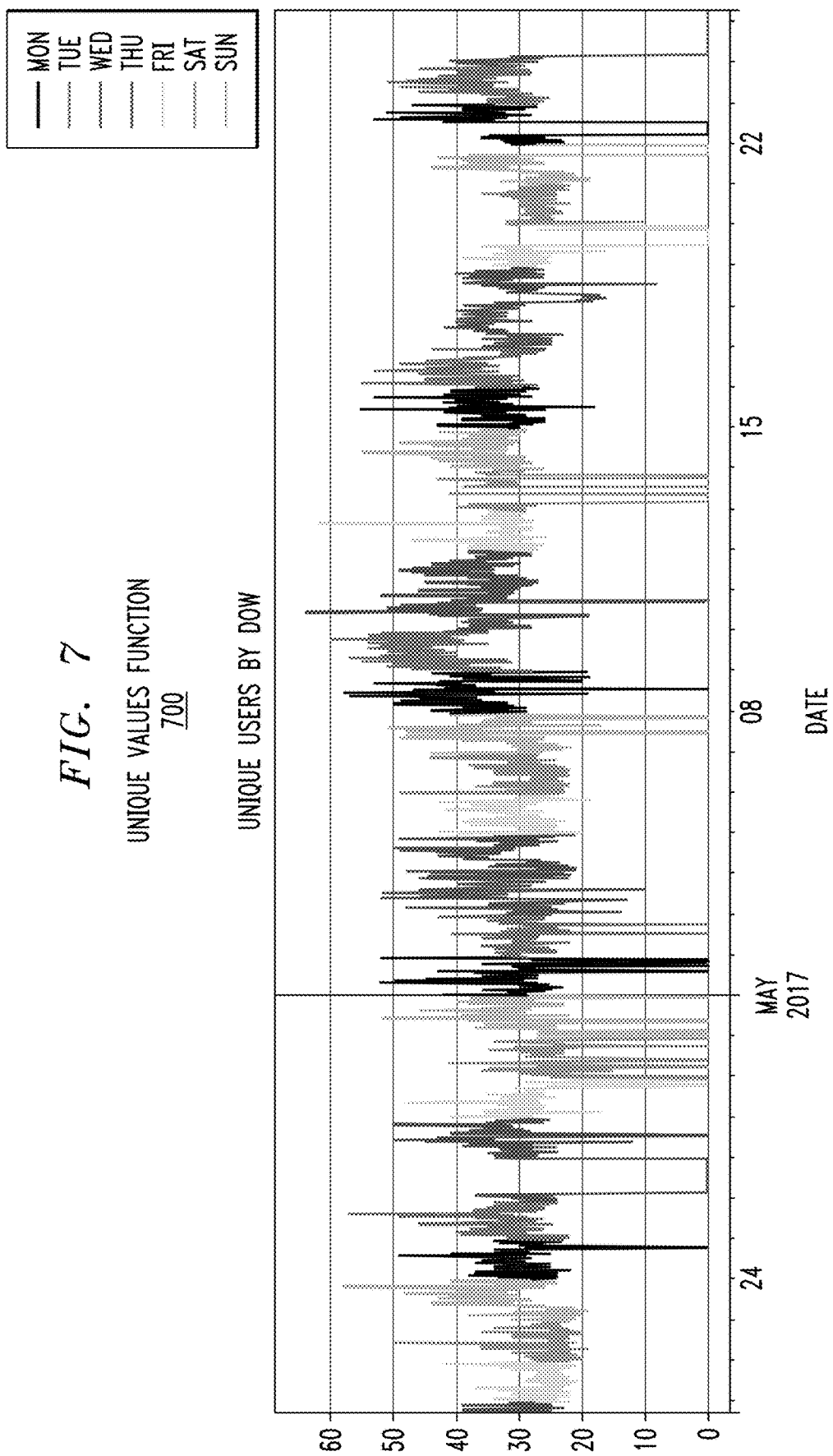

SYSTEM OPERATIONAL ANALYTICS USING ADDITIONAL FEATURES FOR HEALTH SCORE COMPUTATION

FIELD

The field relates generally to system monitoring techniques and, more particularly, to techniques for processing time-series data.

BACKGROUND

Information Technology (IT) systems are becoming increasingly distributed and are often comprised of multiple microservices running in parallel. Thus, monitoring the performance of such IT systems has become increasingly challenging. Human-assisted machine learning (ML) solutions are being deployed to monitor and analyze the behavior of such IT systems and associated software applications.

Traditional ML solutions, however, typically provide naïve models, in the sense that they often take advantage of the data only in its raw form, often with sparse feature values and other data quality issues, potentially resulting in unnecessarily complicated ML models. In addition, the monitoring solution itself may become difficult to track and maintain.

A need therefore exists for improved techniques for monitoring the performance of IT systems and other monitored systems.

SUMMARY

Illustrative embodiments of the present disclosure provide techniques for system operational analytics using additional features over time-series counters for health score computation. In one embodiment, an exemplary method comprises: obtaining log data from one or more data sources associated with a monitored system; applying at least one counting function to the log data to obtain a plurality of time-series counters for a plurality of distinct features within the log data; applying at least one additional function to the plurality of time-series counters for the plurality of distinct features; and processing an output of the at least one additional function using at least one machine learning model to obtain a health score for the monitored system based on the output of the at least one additional function.

In some embodiments, the at least one additional function comprises, for example, an entropy function representing a load balancing of a plurality of devices in the monitored system; one or more clustered counts for a plurality of entities in the monitored system; a number of unique values; and/or one or more modeled operations based on correlations between a plurality of different operations in the monitored system.

Other illustrative embodiments include, without limitation, apparatus, systems, methods and computer program products comprising processor-readable storage media.

BRIEF DESCRIPTION OF THE DRAWINGS

FIG. 7 illustrates an exemplary unique values function, according to some embodiments;

DETAILED DESCRIPTION

Figure 1:
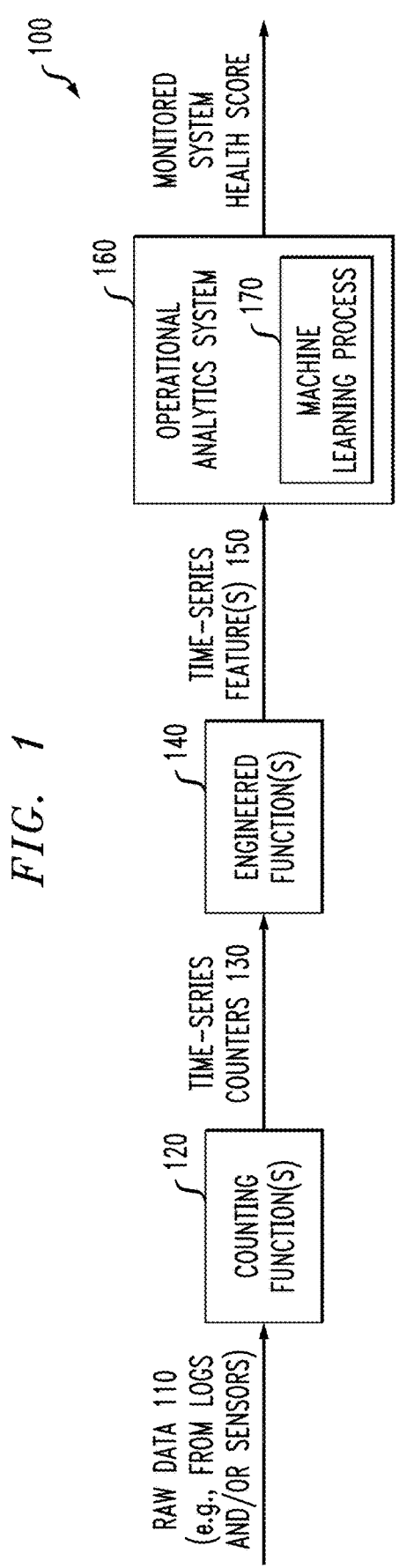
FIG. 1 illustrates an exemplary performance monitoring system, according to at least one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for system operational analytics using additional features over time-series counters for health score computation.

One or more embodiments employ one or more engineered features as features for a machine learning system. In some embodiments, the output of the engineered features is correlated with a failure and/or performance degradation of the system being monitored. The exemplary engineered features are general metrics of interest that can be applied to any IT system, in some embodiments, and include, for example, entropy, unique values counts, expected operations counts and clustered values counts (e.g., monitoring the cumulative activity of similar users).

In at least one embodiment, one or more counting functions are initially applied to log data from a monitored system to obtain one or more time-series counters for distinct features within the log data. One of the exemplary engineered functions is applied to the time-series counter(s) for the distinct features, and an output of the engineered function is processed using a machine learning process to obtain a health score for the monitored system.

In one or more embodiments, one or more predefined engineered functions are applied to time-series counters to obtain corresponding engineered features that may be applied to a machine learning system. The exemplary engineered features are general metrics of interest that can be applied to IT systems. As discussed hereinafter, the exemplary engineered features are generated by applying specific functions or transformations over one or more original log fields (e.g., raw log data). In this manner, the complexity of the applied ML algorithms is reduced, data quality issues are mitigated and higher monitoring capabilities are achieved.

In addition, optional limiting of the solution complexity reduces hardware costs and diminishes the required maintenance for a given monitoring solution.

While the exemplary embodiments are discussed herein using exemplary engineered functions, such as an entropy function 500, discussed further below in conjunction with FIG. 5; a clustered count function 600, discussed further below in conjunction with FIG. 6; a unique values function 700, discussed further below in conjunction with FIG. 7; and a modeled operations function 800, discussed further below in conjunction with FIG. 8; the performance monitoring techniques described herein can be employed using any engineered function that correlates with a failure and/or performance degradation of the monitored system, as would be apparent to a person of ordinary skill in the art.

It has been found that monitoring only the raw counters of values that appear in system logs (e.g., the number of appearances of a specific user or server, and/or the recurrence of a specific operation) limits the monitoring view to basic levels of interrogation. Each of these metrics may have some effect on the system health as a whole (for example, a peak in the activity of a specific user), yet the marginal effect is usually very low. In addition, there are cases where raw counters do not provide meaningful information. One example is a scenario where the number of server calls per minute are counted while servers are frequently restarted or going down for maintenance. In this case, a more sophisticated metric may be needed for measuring server behavior.

Generally, raw counters typically cannot capture the system behavior. For example, by tracking the counts of individual server appearances, an ML solution may miss an important aspect of the system behavior, such as the level of load balancing.

One important aspect of a monitoring solution is often a probabilistic model that, based on past behavior of each individual time series feature, can estimate a holistic instantaneous health score for the system as a whole. Data quality issues may arise when using raw counters for this purpose. There are some cases where counters that appeared to be informative during a training stage are not collected during a real-time monitoring (e.g., due to a user becoming idle). In such scenarios, the model resilience may be affected and may result in false alarms due to poor quality data while the system is actually healthy.

For example, when counting appearances of a specific user, as a function of time, the activity of a typical user may be sparse with time. Thus, the user behavior cannot be properly learned by an ML system or tracked with a naive time-series model.

Learning the behavior of specific users may hold some marginal effect on the accuracy of the health score, yet monitoring all of the individual users highly increases the dimensionality and complexity of the model. Using overly complex models is problematic, both in terms of performance and in terms of efficiency. The reason for the latter is straightforward: the more parameters that the model contains and needs to learn from the data, the higher the amount of resources that are required to be run and maintained. A decline in the performance/accuracy of the health score implies one of two scenarios: (1) the model has over-fitted its parameters to the training data and is now having trouble making general predictions on new data arriving, or (2) the dimensionality of the solution is too high (the number of dimensions is substantially equal to the number of monitored features). Thus, the data examples become too sparse for the solution to first train on and later identify outliers in the data.

One or more embodiments of the disclosure combine the activity of multiple, noisy time-series into one normalized health score that captures the state of the system as a whole.

In order to determine the root cause for the health score decrease, appropriate dashboards are often provided so that investigators can observe and seek out those features whose behavior digresses from a normal baseline. This allows for improved investigation capabilities since investigators are referred to specific points in time when the system behaved abnormally yet the features that are presented to investigators should be selected wisely and sparely. Presenting the entire range of time-series features that are monitored (e.g., all of the individual users of the system) may result in an information overload with human investigators, potentially making it harder for the human investigators to "separate the wheat from the chaff" in terms of factors for the system condition.

Tracking Engineered Features

One or more embodiments of the disclosure enable the tracking of sparse, non-continuous counts of system values appearing in log data. Aspects of the present disclosure recognize that the accuracy of the identified anomalies by traditional ML algorithms such as Time-Series models (ARIMA (autoregressive integrated moving average) or Holt-Winters) and generative models (such as Gaussian Mixture Models) is improved by applying the ML algorithms on abstract and trackable engineered functions over one or more of the raw counts from the source log data. The engineered functions assist the ML algorithm to identify interesting patterns and anomalies found to be highly correlated with system downtime.

FIG. 1 illustrates an exemplary performance monitoring system 100, according to at least one embodiment of the disclosure. As shown in FIG. 1, the exemplary performance monitoring system 100 applies raw collected data 110, such as log data from one or more logs and/or sensors, to one or more counting functions 120 that generate one or more of time-series counters 130 for a plurality of distinct features within the log data.

Figure 4:
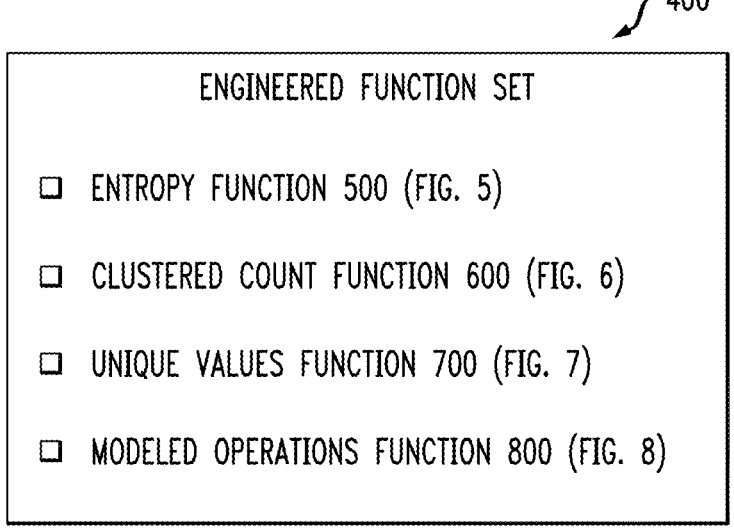
FIG. 4 illustrates an exemplary engineered function set, according to one or more embodiments.

One or more engineered functions 140, as discussed further below in conjunction with FIG. 4, are applied to the time-series counters 130, to generate one or more corresponding engineered features 150. As shown in FIG. 1, the engineered features 150 are processed by an operational analytics system 160 using at least one machine learning process 170 to obtain a monitored system health score.

Figure 2:
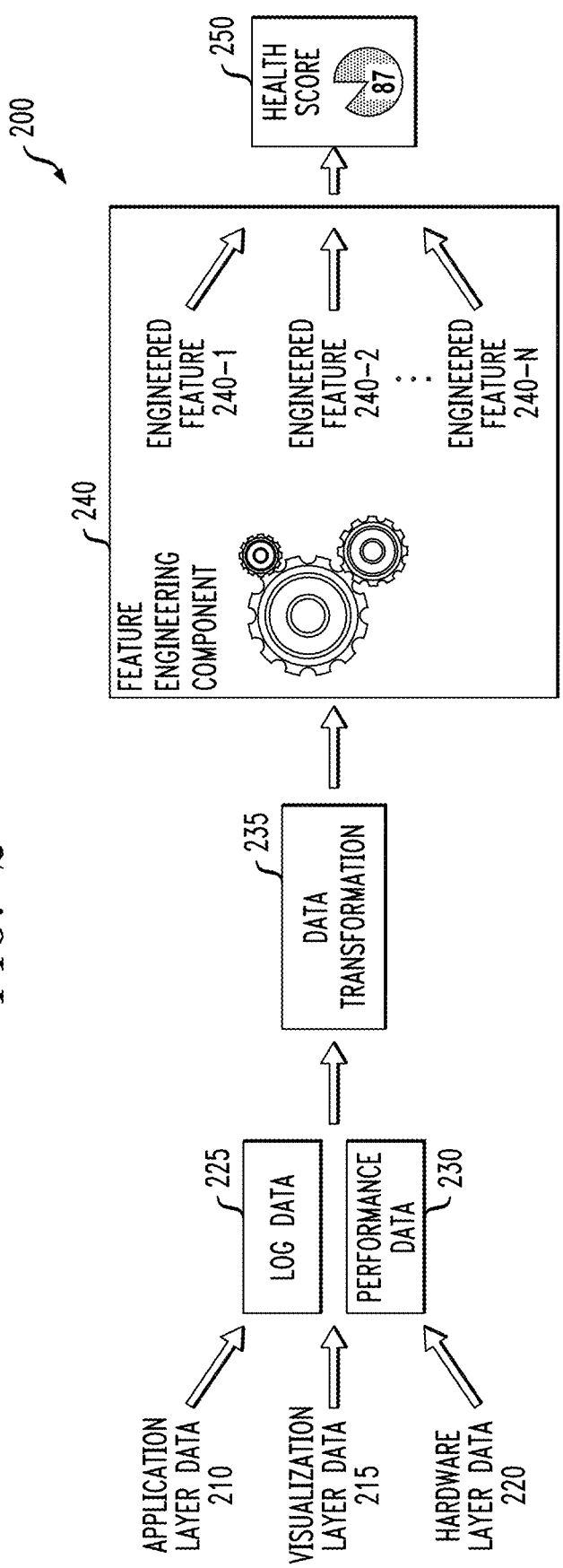
FIG. 2 illustrates an exemplary pipeline in which the exemplary performance monitoring system may be employed, according to some embodiments

FIG. 2 illustrates an exemplary pipeline 200 in which the exemplary performance monitoring system 100 may be employed, according to some embodiments. As shown in FIG. 2, the exemplary pipeline 200 receives one or more of application layer data 210, virtualization layer data 215 and hardware layer data 220, for example, in the form of log data 225 and/or performance data 230. In some embodiments, the application layer data 210 comprises, for example, data from connection and security servers, composers, view agents, and/or event databases. The exemplary virtualization layer data 215 comprises data from vCenter servers, ESXi hosts, vSANs (virtual storage area networks), vCenter databases (e.g., historical events), and/or virtual machines. The exemplary hardware layer data 220 comprises data from, for example, physical servers/appliances, network/storage switches and/or storage arrays. The received log data 225 and/or performance data 230 is transformed into time-series data at stage 235. The data transformation stage 235 applies at least one counting function to the log data 225 and/or performance data 230, to obtain time-series counters for a plurality of distinct features within the log data 225 and/or performance data 230.

In one or more embodiments, a featured engineering component 240 in accordance with the present disclosure generates one or more engineered features 240-1 through 240-N. As noted above, the output of the one or more engineered features 240-1 through 240-N is generally correlated with a failure and/or performance degradation of the system being monitored. The one or more engineered features 240-1 through 240-N are optionally aggregated to generate a single health score 250.

Figure 3:
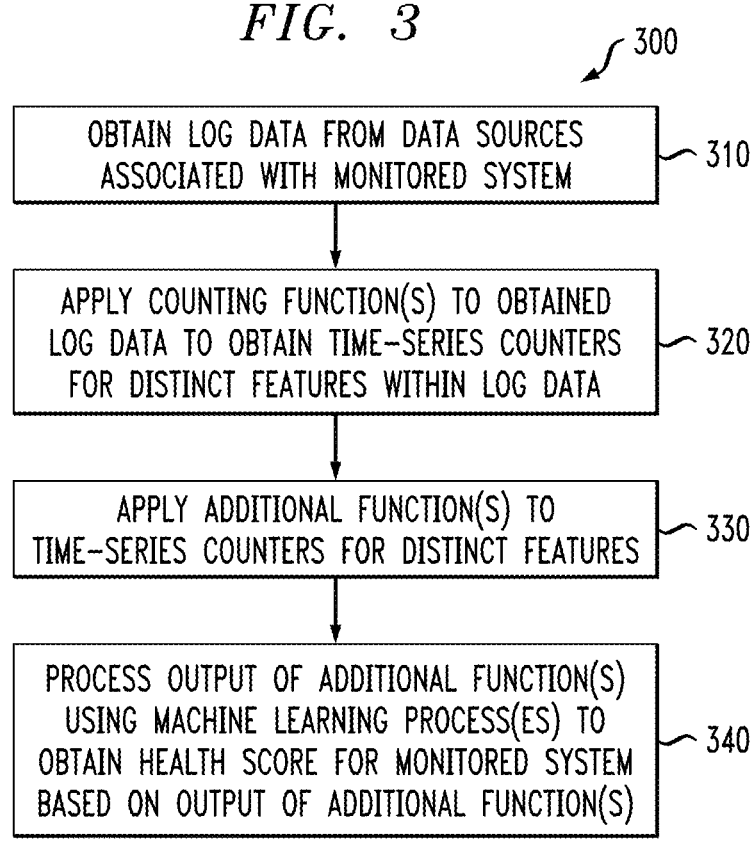
FIG. 3 is a flow chart illustrating an exemplary implementation of a performance monitoring process, according to one embodiment of the disclosure.

FIG. 3 is a flow chart illustrating an exemplary implementation of a performance monitoring process 300, according to one embodiment of the disclosure. As shown in FIG. 3, the exemplary performance monitoring process 300 initially obtains log data from one or more data sources associated with a monitored system during step 310. Thereafter, one or more counting function(s) are applied during step 320 to the obtained log data in order to obtain one or more corresponding time-series counters for distinct features within the log data.

In one or more embodiments, the additional function(s) (e.g., the exemplary engineered functions discussed further below in conjunction with FIG. 4) are applied to the time-series counters for the distinct features during step 330. Finally, the output of the additional function(s) is processed during step 340 using one or more machine learning generative models to obtain a health score for the monitored system based on the output(s) of additional function(s).

FIG. 4 illustrates an exemplary engineered function set 400, according to one or more embodiments. As shown in FIG. 4, the exemplary engineered function set 400 comprises an entropy function 500, discussed further below in conjunction with FIG. 5; a clustered count function 600, discussed further below in conjunction with FIG. 6; a unique values function 700, discussed further below in conjunction with FIG. 7; and a modeled operations function 800, discussed further below in conjunction with FIG. 8. The performance monitoring techniques described herein, however, can be employed using any engineered function that correlates with a failure/degradation in performance of the monitored system, as would be apparent to a person of ordinary skill in the art.

"Engineered features" in this context refers to the application of statistical functions on the raw counts of values arriving from logs data in a general IT system. The disclosed exemplary engineered features are used as time-series inputs to an ML algorithm that identifies anomalies in the system performance in real-time. By applying the disclosed engineering functions in the domain of log analysis and ITOA (IT Operational Analytics), the accuracy of the anomaly-detection solution is improved. The exemplary engineered features in the set 400 capture important aspects of the monitored system (that are generally not directly reflected in the system logs, yet they have been found to be correlated with system faults).

Figure 5:
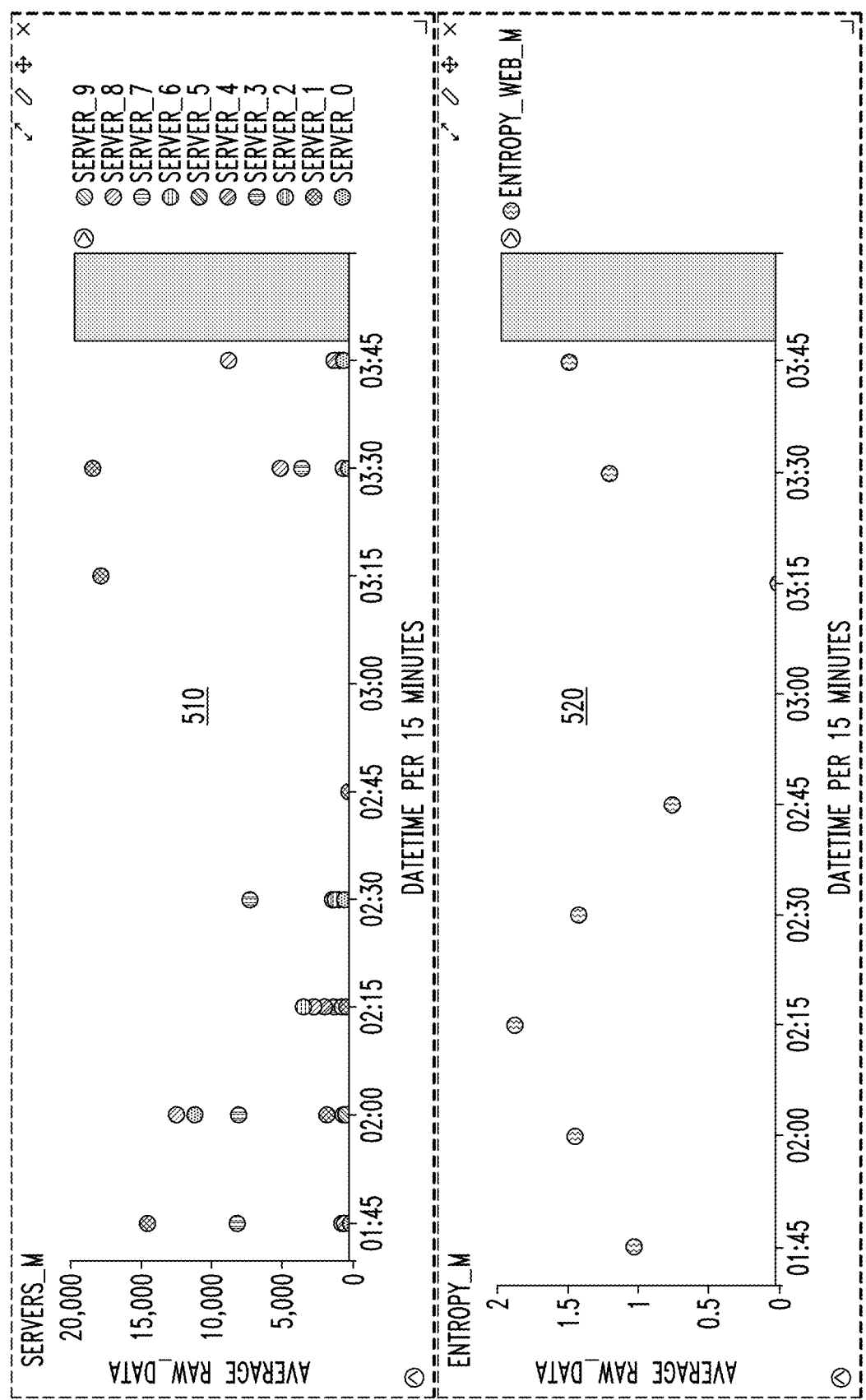
FIG. 5 illustrates an exemplary entropy function, according to some embodiments.

FIG. 5 illustrates an exemplary entropy function 500, according to some embodiments. Generally, the exemplary entropy function 500 monitors the entropy of one or more servers. Rather than tracking the activity of each individual server in the cluster, the exemplary entropy function 500 incorporates the instantaneous server counts into one entropy measure that represents a level of load balancing in the overall system. In some implementations, a higher entropy indicates a better load balancing, as the distribution of server activity approaches a uniform distribution.

The exemplary entropy function 500 receives several numerical inputs and outputs a number that reflects a closeness of the input distribution to a uniform distribution. The formal definition for the exemplary entropy function 500 is expressed as follows:

$$H(X) = \sum_{i=1}^{n} P(x_i)I(x_i) = -\sum_{i=1}^{n} P(x_i)\log_b P(x_i),$$

where $x_i$ is a discrete value arriving from a distribution P.

The exemplary entropy function 500 can be used in the ITOA domain by using the calculated entropy of servers as an engineered feature. The calculated entropy measure reflects the level of load balancing in the monitored system, which is an important feature for measuring system performance. In order to calculate the entropy of the servers from the server field of the log data, the appearances of specific server names are counted in the current time window. These counts are then incorporated into one entropy measure by applying the entropy function.

As shown in FIG. 5, a first plot 510 illustrates a count activity (e.g., appearance raw data) of each individual server in a cluster for each 15 minute interval. The second plot 520 in FIG. 5 illustrates the combined entropy for all of the different servers, calculated using the entropy function 500, for each 15 minute interval. As noted above, a higher entropy indicates a better load balancing, as the distribution of server activity approaches a uniform distribution.

During the 2:15 time window of plot 510, the counts arriving from multiple servers are relatively uniform. Thus, in the 2:15 time window of plot 520, a high entropy score of 2 is assigned at this time stamp. In contrast, during the 3:15 time window of plot 510, one server alone handles all of the load of the system. Thus, in the 3:15 time window of plot 520, a low entropy score of 0 is assigned at this time stamp.

It has been found that the resultant time series "entropy" engineered feature is often informative of the system state. Generally, the higher the entropy value, the better the load balancing, as the distribution of activity approaches a uniform distribution.

Figure 6:
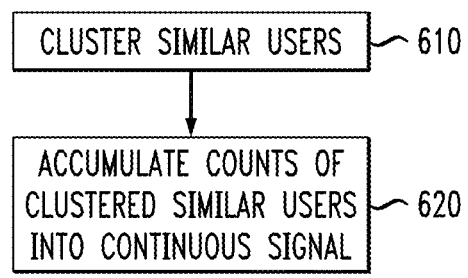
FIG. 6 is a flow chart illustrating an exemplary implementation of a clustered count function, according to one embodiment of the disclosure.

FIG. 6 illustrates an exemplary clustered count function 600, according to one embodiment. Generally, the exemplary clustered count function 600 clusters users, for example. Rather than tracking the sparse activity of each individual user, the exemplary count function 600 clusters together similar users (or another entity) in terms of appearance statistics and other static user features and accumulates the counts of clustered user into one continuous signal.

To cluster similar values appearing in system logs, a K-means (and/or K-means-like) clustering algorithm can be employed. In a K-means clustering implementation, each observation, possessing different attributes, is assigned to a specific group/cluster of similar observations. The total distance of the observations belonging to a specific cluster to the cluster's mean attribute vector is substantially minimized in an optimization stage of the algorithm. A K-means clustering algorithm used by the exemplary clustered count function 600 is described formally as the problem of substantially minimizing these distances, as follows:

$$\underset{S}{\operatorname{argmin}} \sum_{i=1}^{k} \sum_{x \in S_i} \|x - \mu_i\|^2 = \underset{S}{\operatorname{argmin}} \sum_{i=1}^{k} |S_i| \operatorname{Var} S_i,$$

where X is the vector of observations and µ is the vector of centroid mean.

FIG. 6 is a flow chart illustrating an exemplary implementation of a clustered count function 600, according to one embodiment of the disclosure. In one exemplary implementation, K-means clustering is used in the ITOA domain by clustering together similar users together during step 610 and accumulating their counts into one continuous signal during step 620 (e.g., rather than tracking the sparse activity of each individual user). Users are clustered, for example, based on their appearance statistics and other static user features, i.e. a signal may follow the accumulated counts of logs arriving from the most frequent users of the system or from users that have a specific role-id.

FIG. 7 illustrates an exemplary unique values function 700, according to some embodiments. Generally, the exemplary unique values function 700 tracks the number of unique users at each time stamp (e.g., rather than counting the appearance of individual users of the system, which may be sparse and/or become idle for continuous periods). In this manner, the exemplary unique values function 700 provides a view to the load levels that the monitored system is facing.

It has been found that most of the fields in the system logs are categorical (e.g., their values are discrete and arrive from a fixed set). In many cases counting the number of unique values appearing in a log field during a specific time window is informative of the monitored system state and the load that the monitored system is currently facing.

As an example, one can count the number of unique users that are currently logged into the system. Tracking the number of unique users at each time stamp allows a view to the load levels the system is handling.

FIG. 7 illustrates the number of unique users for each day of the week (DOW) over a period of time, according to an embodiment. The signal for the number of unique users at each time stamp is continuous and has been found to be informative. As can be seen in FIG. 7, a pattern can be identified for the activity of users in weekdays versus weekends, suggesting that anomalies can be identified for this signal.

Figure 8:
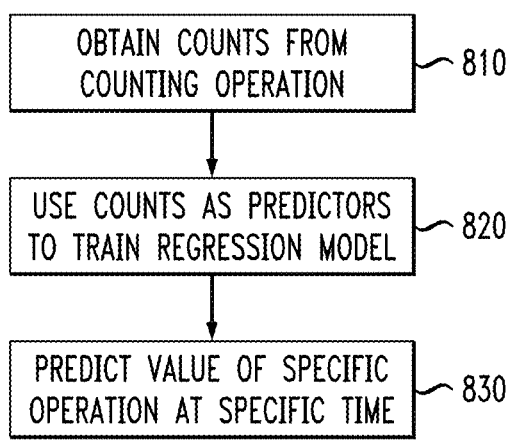
FIG. 8 is a flow chart illustrating an exemplary implementation of a modeled operations function, according to one embodiment of the disclosure.

FIG. 8 is a flow chart illustrating an exemplary implementation of a modeled operations function 800, according to one embodiment of the disclosure. Generally, the exemplary modeled operations function 800 utilizes the correlations between different operations in the system to predict the value of a specific operation at specific time stamps (e.g., by using the counts of other operations as predictors for training a regression model). This new time-series for "modeled operations" is a function of multiple raw counts and can be tracked in search for abnormal system behavior.

Looking at the correlation matrix of different operations performed in an IT system, it is common to observe high levels of correlation between specific operations. Thus, in almost any IT system, one can find sets of operations that tend to appear together or in close temporal proximity.

For example, these correlations can be utilized by constructing a regression model that predicts the value of specific operation at specific time-stamps by using the counts of other operations as predictors. The disclosed exemplary modeled operations function 800 is a function of multiple raw counts of other operations and can be tracked in search for unpredicted system behavior.

As shown in FIG. 8, the exemplary modeled operations function 800 initially obtains feature counts from a counting operation during step 810. The obtained counts are used during step 820 as predictors to train a regression model. Finally, the exemplary modeled operations function 800 predicts the value of a specific operation at a specific time during step 830 using the trained regression model.

Generally, the exemplary engineered functions 400 and associated engineered features described herein enrich the inputs to the existing ML methods and improve the accuracy of the applied ML solution.

It has been found that the disclosed engineered features give better insight into the system health. Interesting aspects of the system, such as the level of load balancing, may only display as a function combining multiple raw counters of the counts of the individual server and not in system logs themselves. Yet there is no guarantee that the model will identify these patterns, especially if the dimensionality is high. "Pushing" the ML model in the right direction using the disclosed engineered features can uncover patterns of behavior discovered prior to applying the solution. The mutual entropy of individual servers, for example, captures the level of load balancing in the system. The entropy has been found to be highly correlated with system faults. Thus, using the exemplary entropy function 500 as a feature for the ML model increases the ability to identify abnormal behavior.

Using the disclosed engineered features (e.g., instead of raw counters) can help tackle the challenge of sparse raw counters. For example, one can monitor the cumulative behavior of multiple similar users to avoid sparseness and missing periods in the data. In other words, the disclosed engineered features can be viewed as a way to cluster the activities of multiple, sparse raw counters, e.g., specific user counts, into one continuous and meaningful signal (e.g., the mutual activity of similar users or the number of unique users).

Among other benefits, the disclosed engineered features permit compact ML models that are generally more accurate and easier to maintain. Using the disclosed engineered features (e.g., instead of raw counters) allows the information in each of the individual counters to be integrated into one informative signal adhering to an important aspect of the system. For example, instead of monitoring the individual behavior for each server (which can reach tens and even hundreds in modern systems) the entropy is calculated (e.g., a statistical measure for the level of disorder in the system) that can capture the efficiency of the load balancer with one monitored feature. This reduction in the number of monitored features limits the dimensionality of the solution, thus making it easier to identify abnormal behavior. In addition, a lower number of monitored and perhaps noisy features allows the solution to run more efficiently.

In addition, the disclosed monitoring of the engineered features improves the interpretability of the results. Generally, monitoring the disclosed engineered features that are a function of one or more raw counters allows a priori information of important aspects of the system to be compactly incorporated. Once an anomaly is identified in the total health score of the system, investigators can refer to designated dashboards and acquire knowledge of the features that are acting abnormally. For example, it has been found that the system health is often highly correlated with the level of load balancing over different servers in the system. When such anomalies occur, it is hard for investigators to determine the root cause by examining the individual behavior of each one of the servers running in parallel. Instead, one can observe two engineered features: the number of active servers and the entropy, which is a statistical measure capturing how close the distribution of the servers' counts is to a unified distribution. This way of interrogation allows a faster and better understanding of the immediate cause for the decline in system health.

Figure 9A:
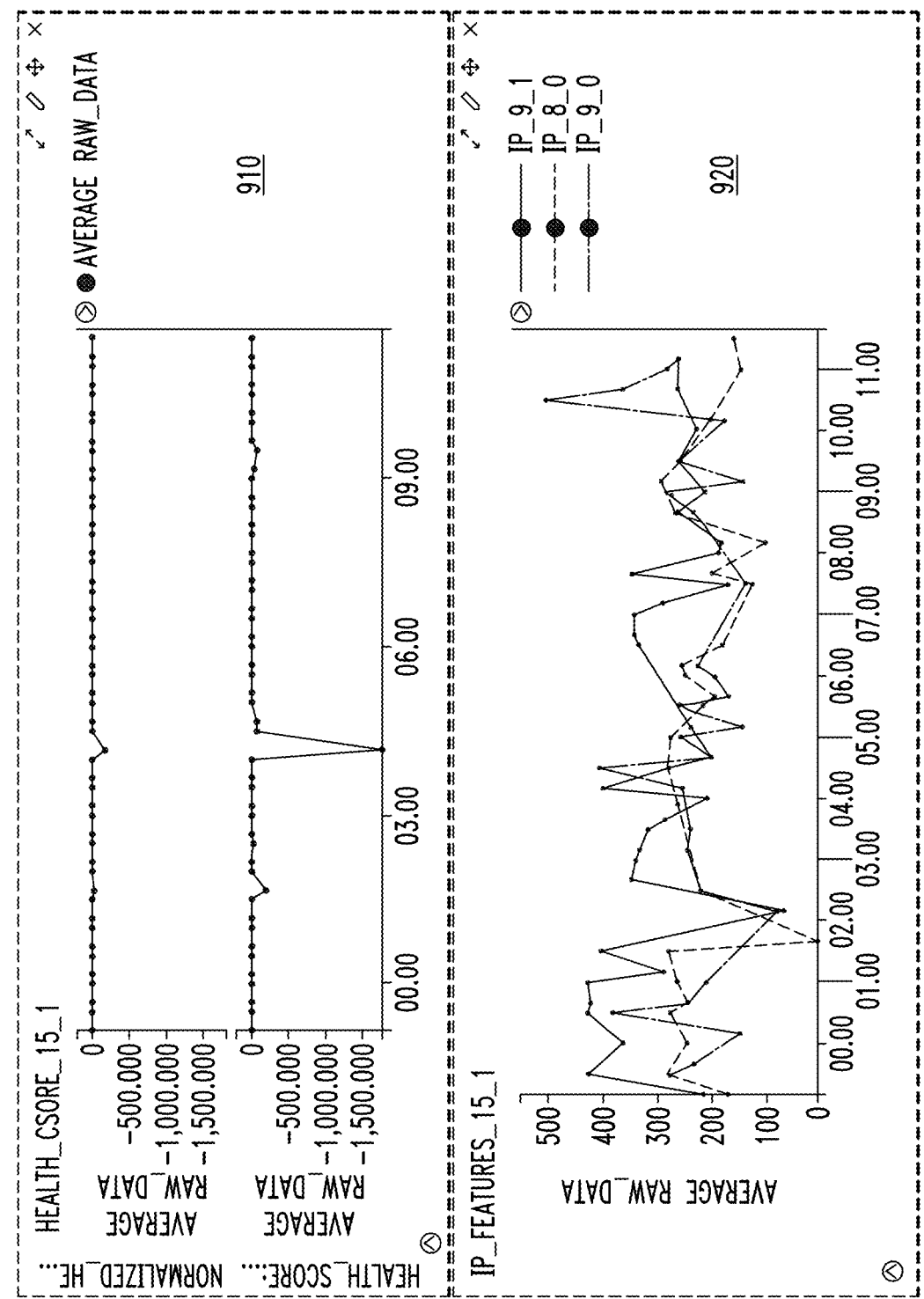
FIGS. 9A and 9B, collectively, illustrate an exemplary monitoring dashboard for presenting the system health information obtained using the disclosed engineered features, according to some embodiments.
Figure 9B:
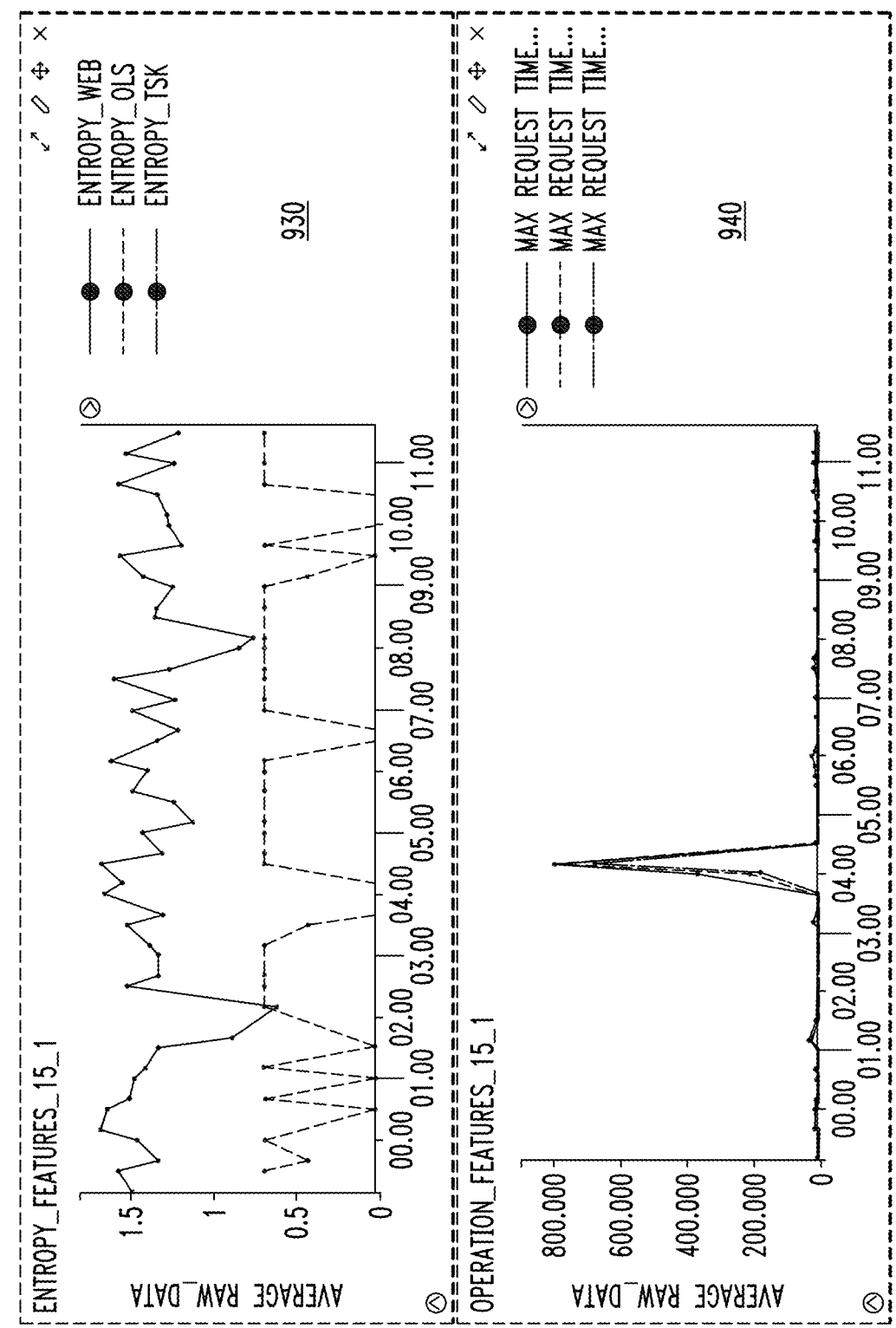

FIGS. 9A and 9B, collectively, illustrate an exemplary monitoring dashboard 900, 950 for presenting the system health information obtained using the disclosed engineered features, according to some embodiments. As noted above, monitoring the disclosed engineered features improves the interpretability of the results. FIGS. 9A and 9B illustrate different measurable values that the system outputs to the exemplary monitoring dashboard 900, 950. As shown in FIG. 9A, a first plot 910 on the exemplary monitoring dashboard 900 illustrates an output indicating a holistic health score adhering to the overall system health.

In addition, a plot 920 on the exemplary monitoring dashboard 900 illustrates the clustered counts of users belonging to the same subnet (indicated by the prefix of their IP addresses), in accordance with the clustered count function 600.

As shown in FIG. 9B, an exemplary plot 930 on the exemplary monitoring dashboard 950 illustrates the entropy measure for different server clusters, as computed by the exemplary entropy function 500. Finally, the exemplary plot 940 on the exemplary monitoring dashboard 950 illustrates the average response time for different operations. By comparing the instantaneous health score to significant aspects of the system, as reflected in the monitored features, one can make sense of the results and associate anomalies to specific failures (e.g., some of the servers are down, or the system is facing a higher load of users than usual).

EXAMPLE

One exemplary implementation of an IT Operational Analytics monitoring system monitors mission critical applications and integrates multiple Key Performance Indicators (KPIs) extracted from the application log data into one normalized health score adhering to the system state. In the exemplary solution, each KPI is a time-series of values that are later handled as "features" used as input to a machine learning model that learns the system normal behavior as a whole. This solution enables faster detection of non-trivial abnormal behavior of the system as well as better investigation capabilities when such behavior occurs.

In one implementation, an object oriented solution is employed. Each "feature" class contains a list of time ordered values, describing individual measurable properties of the phenomena being observed. For example, the counts in time of a specific operation. To ensure modularity, there is separation between the feature classes that hold the relevant data and the model classes using this data to learn the normal behavior.

In order to acquire the data, the feature class contains a reading method that reads the data from a specific data column in the data set. This column contains the counts of specific values as they appear in the system's logs. Engineered feature classes inherit the basic feature functionality and extend it by adding the ability to read data from several columns, execute algorithms to combine this data into one column and store it in the basic feature data list. For example, the entropy engineered feature class contains the functions for reading the columns holding the counts for each of the system active servers and computing the entropy for each consecutive time stamp using the entropy function 500.

Likewise, the unique values engineered feature also contains functions for reading the columns holding the appropriate counts, as well as for computing the unique values function 700.

In addition, a basic feature is defined to contain a function for reading a column holding the appropriate counts from a database.

For example, the entropy engineered feature and the unique values feature classes inherit the functionality for reading and storing the raw counts data from the data base from the basic feature. In each of the engineered features, this basic function is overloaded by the appropriate reading and calculating functionality for the new engineered feature.

Thus, the basic and engineered data is held in the same data structure, per feature (e.g., the type of applied feature is transparent to the ML model).

The exemplary solution outputs, including the instantaneous health score and the time-series engineered features, can be visualized with smart dashboards using Kibana or another visualization tool.

In some embodiments, the disclosed system operational analytics techniques use additional features over time-series counters for computing a health score.

Among other benefits, the disclosed performance monitoring techniques provide better insight into system health and provide compact models that are more accurate and easier to maintain. As noted above, the exemplary engineered features improve the interpretability of the generated system health score.

One or more embodiments of the disclosure provide improved methods, apparatus and computer program products for system operational analytics using additional features over time-series counters for computing a health score. The foregoing applications and associated embodiments should be considered as illustrative only, and numerous other embodiments can be configured using the techniques disclosed herein, in a wide variety of different applications.

It should also be understood that the disclosed performance monitoring techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed performance monitoring techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based performance monitoring engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based performance monitoring platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
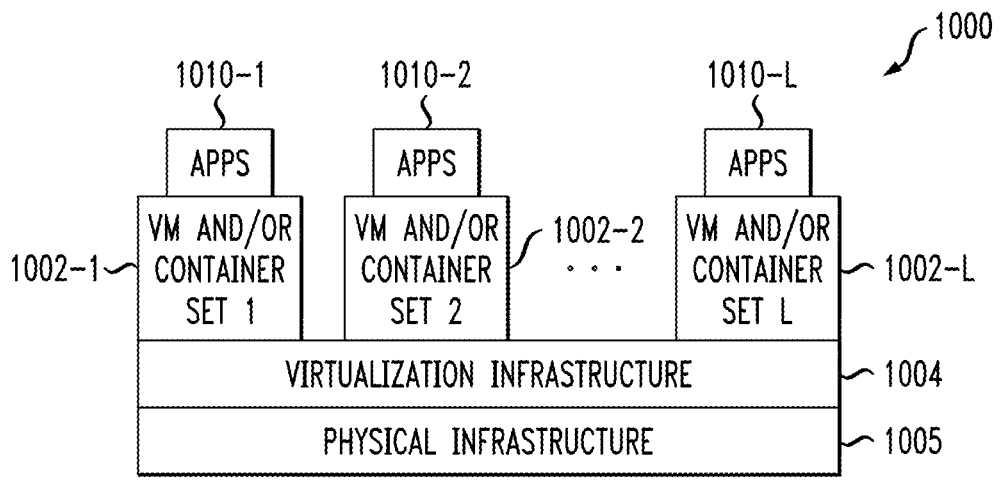
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of a performance monitoring system. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide performance monitoring functionality of the type described above for one or more processes running on a given one of the VMs. For example, each of the VMs can implement performance monitoring control logic and associated performance monitoring functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide performance monitoring functionality of the type described above for one or more processes running on different ones of the containers. For example, a container host device supporting multiple containers of one or more container sets can implement one or more instances of performance monitoring control logic and associated performance monitoring functions.

As is apparent from the above, one or more of the processing modules or other components of a performance monitoring system may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
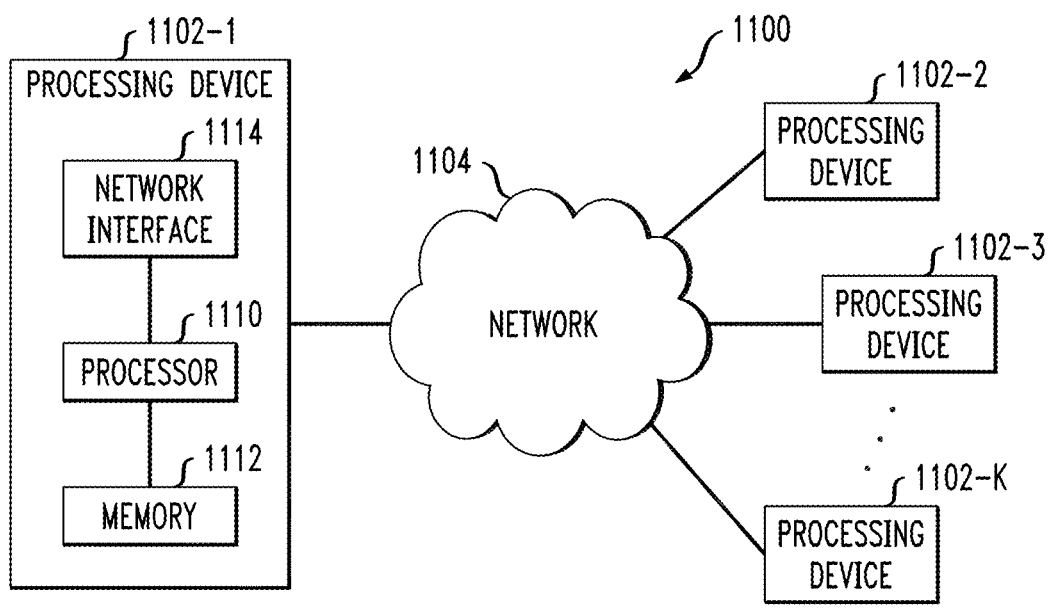
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining log data from one or more data sources associated with a monitored system;
    applying at least one counting function to said log data to obtain a plurality of time-series counters for a plurality of distinct features within the log data;
    applying, using at least one processing device, at least one additional function to at least two of said plurality of time-series counters for the plurality of distinct features to generate an output of the at least one additional function, wherein the output of the at least one additional function is indicative of one or more of a failure and a degradation in performance of the monitored system;
    applying, using the at least one processing device, the output of the at least one additional function to at least one machine learning model that generates a health score for said monitored system based on said output of the at least one additional function; and
    detecting an anomaly in the monitored system based on said health score.

2. The method of claim 1, wherein the one or more data sources comprise one or more of a monitoring log and a monitoring sensor.

3. The method of claim 1, wherein the time-series counters are substantially continuous signals.

4. The method of claim 1, wherein the at least one additional function comprises an entropy function representing a load balancing of a plurality of devices in the monitored system.

5. The method of claim 1, wherein the at least one additional function comprises one or more clustered counts for a plurality of entities in the monitored system.

6. The method of claim 1, wherein the at least one additional function comprises a number of unique values.

7. The method of claim 1, wherein the at least one additional function comprises one or more modeled operations based on correlations between a plurality of different operations in the monitored system.

8. The method of claim 1, wherein the log data is obtained from a plurality of layers of the monitored system.

9. The method of claim 1, wherein the at least one additional function is selected from an engineered function set comprising two or more of: an entropy function, a clustered counts function for a plurality of entities, a number of unique values function, and one or more modeled operations functions based on correlations between a plurality of different operations.

10. A system, comprising:
    a memory; and
    at least one processing device, coupled to the memory, operative to implement the following steps:
    obtaining log data from one or more data sources associated with a monitored system;
    applying at least one counting function to said log data to obtain a plurality of time-series counters for a plurality of distinct features within the log data;

applying, using at least one processing device, at least one additional function to at least two of said plurality of time-series counters for the plurality of distinct features to generate an output of the at least one additional function, wherein the output of the at least one additional function is indicative of one or more of a failure and a degradation in performance of the monitored system;

applying, using the at least one processing device, the output of the at least one additional function to at least one machine learning model that generates a health score for said monitored system based on said output of the at least one additional function; and detecting an anomaly in the monitored system based on said health score.

11. The system of claim 10, wherein the at least one additional function comprises an entropy function representing a load balancing of a plurality of devices in the monitored system.

12. The system of claim 10, wherein the at least one additional function comprises one or more clustered counts for a plurality of entities in the monitored system.

13. The system of claim 10, wherein the at least one additional function comprises a number of unique values.

14. The system of claim 10, wherein the at least one additional function comprises one or more modeled operations based on correlations between a plurality of different operations in the monitored system.

15. A computer program product, comprising a non-transitory machine-readable storage medium having encoded therein executable code of one or more software programs, wherein the one or more software programs when executed by at least one processing device perform the following steps:

obtaining log data from one or more data sources associated with a monitored system;

applying at least one counting function to said log data to obtain a plurality of time-series counters for a plurality of distinct features within the log data;

applying, using at least one processing device, at least one additional function to at least two of said plurality of time-series counters for the plurality of distinct features to generate an output of the at least one additional function, wherein the output of the at least one additional function is indicative of one or more of a failure and a degradation in performance of the monitored system;

applying, using the at least one processing device, the output of the at least one additional function to at least one machine learning model that generates a health score for said monitored system based on said output of the at least one additional function; and detecting an anomaly in the monitored system based on said health score.

16. The computer program product of claim 15, wherein the at least one additional function comprises an entropy function representing a load balancing of a plurality of devices in the monitored system.

17. The computer program product of claim 15, wherein the at least one additional function comprises one or more clustered counts for a plurality of entities in the monitored system.

18. The computer program product of claim 15, wherein the at least one additional function comprises a number of unique values.

19. The computer program product of claim 15, wherein the at least one additional function comprises one or more modeled operations based on correlations between a plurality of different operations in the monitored system.

20. The computer program product of claim 15, wherein the at least one additional function is selected from an engineered function set comprising two or more of: an entropy function, a clustered counts function for a plurality of entities, a number of unique values function, and one or more modeled operations functions based on correlations between a plurality of different operations.

* * * * *